(12) United States Patent  (10) Patent No.: US 12,130,943 B1
Burns et al.  (45) Date of Patent: Oct. 29, 2024

(54) GENERATIVE ARTIFICIAL INTELLIGENCE MODEL PERSONALLY IDENTIFIABLE INFORMATION DETECTION AND PROTECTION

(71) Applicant: HiddenLayer, Inc, Austin, TX (US)

(72) Inventors: Tanner Burns, Austin, TX (US); Kwesi Cappel, Austin, TX (US); Kenneth Yeung, Ottawa (CA)

(73) Assignee: HiddenLayer, Inc., Austin, TX (US)

( * ) Notice: Subject to any disclaimer, the term of this patent is extended or adjusted under 35 U.S.C. 154(b) by 0 days.

(21) Appl. No.: 18/621,751

(22) Filed: Mar. 29, 2024

(51) Int. Cl.
*H04L 29/06* (2006.01)
*G06F 21/62* (2013.01)

(52) U.S. Cl.
CPC ................ *G06F 21/6245* (2013.01)

(58) Field of Classification Search
None
See application file for complete search history.

(56) References Cited

U.S. PATENT DOCUMENTS

| | | | |
|---|---|---|---|
| 7,802,298 B1 | 9/2010 | Hong et al. | |
| 9,356,941 B1 | 5/2016 | Kislyuk et al. | |
| 10,193,902 B1 | 1/2019 | Caspi et al. | |
| 10,210,036 B2 | 2/2019 | Iyer et al. | |
| 10,462,168 B2 | 10/2019 | Shibahara et al. | |
| 10,764,313 B1 | 9/2020 | Mushtaq | |
| 10,803,188 B1 * | 10/2020 | Rajput | G06F 21/62 |
| 11,310,270 B1 | 4/2022 | Weber et al. | |
| 11,483,327 B2 | 10/2022 | Hen et al. | |
| 11,501,101 B1 | 11/2022 | Ganesan et al. | |
| 11,551,137 B1 | 1/2023 | Echauz et al. | |
| 11,601,468 B2 | 3/2023 | Angel et al. | |
| 11,710,067 B2 | 7/2023 | Harris et al. | |
| 11,762,998 B2 | 9/2023 | Kuta et al. | |
| 11,777,957 B2 | 10/2023 | Chen et al. | |
| 11,797,672 B1 * | 10/2023 | Beveridge | G06N 3/045 |
| 11,875,130 B1 * | 1/2024 | Bosnjakovic | G06N 3/0475 |
| 11,893,111 B2 | 2/2024 | Sai et al. | |
| 11,893,358 B1 * | 2/2024 | Lakshmikanthan | G06F 16/3329 |
| 11,921,903 B1 * | 3/2024 | Beveridge | G06F 21/629 |
| 11,954,199 B1 * | 4/2024 | Burns | G06F 21/577 |
| 11,960,514 B1 * | 4/2024 | Taylert | G06F 16/3329 |
| 11,971,914 B1 * | 4/2024 | Watson | G06F 16/3347 |
| 11,972,333 B1 * | 4/2024 | Horesh | G06N 3/088 |
| 11,995,180 B1 * | 5/2024 | Cappel | G06F 21/55 |
| 11,997,059 B1 * | 5/2024 | Su | H04L 51/063 |
| 12,026,255 B1 * | 7/2024 | Burns | G06F 21/554 |

(Continued)

OTHER PUBLICATIONS

Morozov et al., 2019, "Unsupervised Neural Quantization for Compressed-Domain Similarity Search," International Conference on Computer Vision (ICCV) 2019 (11 pages).

*Primary Examiner* — Shin-Hon (Eric) Chen
(74) *Attorney, Agent, or Firm* — Jones Day

(57) ABSTRACT

An analysis engine receives data characterizing a prompt for ingestion by a generative artificial intelligence (GenAI) model. The analysis engine, using the received data, determines whether the prompt comprises personally identifiable information (PII) or elicits PII from the GenAI model. The analysis engine can use pattern recognition to identify PII entities in the prompt. Data characterizing the determination is provided to a consuming application or process. Related apparatus, systems, techniques and articles are also described.

28 Claims, 13 Drawing Sheets

(56) References Cited

U.S. PATENT DOCUMENTS

| | | | |
|---|---|---|---|
| 12,086,170 B2* | 9/2024 | Zacharia | G06F 40/30 |
| 2014/0033307 A1 | 1/2014 | Schmidtler | |
| 2014/0157415 A1 | 6/2014 | Abercrombie et al. | |
| 2016/0344770 A1 | 11/2016 | Verma et al. | |
| 2017/0251006 A1 | 8/2017 | LaRosa et al. | |
| 2017/0331841 A1 | 11/2017 | Hu et al. | |
| 2018/0063190 A1 | 3/2018 | Wright et al. | |
| 2018/0205734 A1 | 7/2018 | Wing et al. | |
| 2018/0219888 A1 | 8/2018 | Apostolopoulos | |
| 2018/0324193 A1 | 11/2018 | Ronen et al. | |
| 2019/0050564 A1 | 2/2019 | Pogorelik et al. | |
| 2019/0260784 A1 | 8/2019 | Stockdale et al. | |
| 2019/0311118 A1 | 10/2019 | Grafi et al. | |
| 2020/0019721 A1* | 1/2020 | Shanmugam | G06F 11/3664 |
| 2020/0076771 A1* | 3/2020 | Maier | H04L 63/0407 |
| 2020/0219009 A1 | 7/2020 | Dao et al. | |
| 2020/0233979 A1 | 7/2020 | Maraghoosh et al. | |
| 2020/0285737 A1 | 9/2020 | Kraus et al. | |
| 2020/0409323 A1 | 12/2020 | Spalt et al. | |
| 2021/0209464 A1 | 7/2021 | Bala et al. | |
| 2021/0224425 A1 | 7/2021 | Nasr-Azadani et al. | |
| 2021/0319784 A1 | 10/2021 | Le Roux et al. | |
| 2021/0357508 A1 | 11/2021 | Elovici et al. | |
| 2021/0374247 A1 | 12/2021 | Sultana et al. | |
| 2021/0407051 A1 | 12/2021 | Pardeshi et al. | |
| 2022/0030009 A1 | 1/2022 | Hasan | |
| 2022/0058444 A1 | 2/2022 | Olabiyi et al. | |
| 2022/0070195 A1 | 3/2022 | Sern et al. | |
| 2022/0114399 A1 | 4/2022 | Castiglione et al. | |
| 2022/0147597 A1 | 5/2022 | Bhide et al. | |
| 2022/0164444 A1 | 5/2022 | Prudkovskij et al. | |
| 2022/0166795 A1 | 5/2022 | Simioni et al. | |
| 2022/0182410 A1 | 6/2022 | Tupsamudre et al. | |
| 2022/0269796 A1 | 8/2022 | Chase et al. | |
| 2022/0309179 A1 | 9/2022 | Payne et al. | |
| 2023/0008037 A1* | 1/2023 | Venugopal | G06F 11/3684 |
| 2023/0027149 A1 | 1/2023 | Kuan et al. | |
| 2023/0049479 A1 | 2/2023 | Mozo Velasco et al. | |
| 2023/0109426 A1 | 4/2023 | Hashimoto et al. | |
| 2023/0148116 A1 | 5/2023 | Stokes et al. | |
| 2023/0169397 A1 | 6/2023 | Smith et al. | |
| 2023/0185912 A1 | 6/2023 | Sinn et al. | |
| 2023/0185915 A1 | 6/2023 | Rao et al. | |
| 2023/0259787 A1 | 8/2023 | David et al. | |
| 2023/0269263 A1 | 8/2023 | Yarabolu | |
| 2023/0274003 A1 | 8/2023 | Liu et al. | |
| 2023/0289604 A1 | 9/2023 | Chan et al. | |
| 2023/0351143 A1 | 11/2023 | Kutt et al. | |
| 2023/0359903 A1 | 11/2023 | Cefalu et al. | |
| 2023/0388324 A1 | 11/2023 | Thompson | |
| 2024/0022585 A1* | 1/2024 | Burns | H04L 63/1425 |
| 2024/0039948 A1 | 2/2024 | Koc et al. | |
| 2024/0045959 A1 | 2/2024 | Marson et al. | |
| 2024/0078337 A1* | 3/2024 | Kamyshenko | G06F 21/6245 |
| 2024/0080333 A1 | 3/2024 | Burns et al. | |
| 2024/0126611 A1 | 4/2024 | Phanishayee et al. | |
| 2024/0160902 A1 | 5/2024 | Padgett et al. | |

\* cited by examiner

US 12,130,943 B1

GENERATIVE ARTIFICIAL INTELLIGENCE MODEL PERSONALLY IDENTIFIABLE INFORMATION DETECTION AND PROTECTION

TECHNICAL FIELD

The subject matter described herein relates to techniques for detecting personally identifiable information (PII) within prompts and outputs of generative artificial intelligence models and for taking remedial action to protect such models from exhibiting unintended behavior.

BACKGROUND

Machine learning (ML) algorithms and models, such as large language models, are trained on large amounts of data to make predictions based on subsequently input data. In some cases, these models are trained on data sets which include personally identifiable information (PII) which is subject to various disclosure and usage restrictions. In addition, these models have attack surfaces that can be vulnerable to cyberattacks in which adversaries attempt to manipulate or modify model behavior. These cyberattacks can act to corrupt input data so as to make outputs unreliable or incorrect. By modifying or otherwise manipulating the input of a model, an attacker can modify an output of an application or process for malicious purposes including bypassing security measures resulting in PII data leakage or unauthorized system access.

SUMMARY

In one aspect, an analysis engine receives data characterizing a prompt for ingestion by a generative artificial intelligence (GenAI) model. The analysis engine, using the received data, determines whether the prompt comprises personally identifiable information (PII) or elicits PII from the GenAI model. The analysis engine can use pattern recognition to identify PII entities in the prompt. Data characterizing the determination is provided to a consuming application or process.

The PII entities can be classified using, for example, at least one machine learning model, as one of a plurality of entity types. These entity types can be used to initiate at least one remediation action corresponding to the entity to modify or block the prompt.

In some cases, the data characterizing the prompt is tokenized to result in a plurality of tokens which are used by the analysis engine as part of the determining.

The data characterizing the prompt can be vectorized to result in one or more vectors. One or more embeddings can be generated based on the one or more vectors which have a lower dimensionality than the one or more vectors. The analysis engine can utilize the generated one or more embeddings for the determining.

The GenAI model can include a large language model.

The consuming application or process can allow the prompt to be input into the GenAI model upon a determination that the prompt does not comprise or elicit PII The consuming application or process can prevent the prompt from being input into the GenAI model upon a determination that the prompt comprises or elicits PII.

The consuming application or process can flag the prompt as comprising PII for quality assurance upon a determination that the prompt comprises or elicits PII.

The consuming application or process can modify the prompt to remove or redact the PII upon a determination that the prompt comprises or elicits PII and can cause the modified prompt to be ingested by the GenAI model.

A blocklist can be used to determine whether the prompt comprises or elicits undesired behavior from the GenAI model. In such cases, the prompt can be prevented from being ingested by the GenAI model when it is determined that the prompt comprises or elicits undesired behavior from the GenAI model. Alternatively, the prompt can be modified to be benign when it is determined that the prompt comprises or elicits undesired behavior from the GenAI model. The modified prompt is then ingested by the GenAI model.

The analysis engine can use natural language processing to identify and extract strings belonging to specific entity types likely to comprise PII.

Similar operations can be conducted on the output of a GenAI model. In an interrelated aspect, an analysis engine receives data characterizing an output of a generative artificial intelligence (GenAI) model (e.g., an LLM, etc.) responsive to a prompt. The analysis engine, using the received data, determines whether the output comprises personally identifiable information (PII). The analysis engine can using pattern recognition to identify PII entities in the output. Data characterizing the determination is provided to a consuming application or process.

The identified PII entities can be classified using, for example, a machine learning model as being one of a plurality of entity types. Different entity types can result in different, corresponding remediation actions be initiated so as to modify or block the output.

The data characterizing the output can be tokenized to result in a plurality of tokens for use by the analysis engine as part of the determining.

The data characterizing the output can be vectorized to result in one or more vectors. These vectors are then used to generate one or more embeddings having a lower dimensionality than the one or more vectors which are used to be the analysis engine as part of the determining.

The consuming application or process can allow the output to be transmitted to a requestor upon a determination that the output does not comprise PII.

The consuming application or process can prevent the output to be transmitted to a requestor upon a determination that the output comprises PII.

The consuming application or process can flag the output as comprising PII for quality assurance upon a determination that the output comprises PII.

The consuming application or process can modify the output to remove or redact the PII upon a determination that the output comprises PII.

The analysis engine can use natural language processing to identify and extract strings belonging to specific entity types likely to comprise PII.

In a further interrelated aspect, a prompt is received from a requestor for ingestion by an artificial intelligence (AI) model. Thereafter, it is determined, using pattern recognition, whether prompt comprises personally identifiable information (PII). The prompt is blocked for ingestion by the AI model if it is determined that the prompt comprises PII. An output of the AI model responsive to the prompt is received if it is determined that the prompt does not comprise PII. It is then determined, using pattern recognition, whether the output comprises PII. The output is allowed to be transmitted to the requestor if it is determined that the output does not comprise PII. Otherwise, the output is selectively redacted before transmission to the requestor based on a policy associated the requestor. The policy can specify levels or types of PII that require redaction for the requestor.

Non-transitory computer program products (i.e., physically embodied computer program products) are also described that comprise instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter can be used to identify and stop attempts to solicit PII from artificial intelligence models including large language models. Further, the current subject matter can provide enhanced visibility into the health and security of an enterprise's machine learning assets. Still further, the current subject matter can be used to detect, alert, and take responsive action when PII is solicited or forms part of a model output.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to advanced techniques for identifying and preventing the disclosure of PII by advanced artificial intelligence (AI) models including GenAI models such as large language models. These techniques analyze the inputs and/or outputs of the GenAI models to determine whether they indicate that there is an attempt for the GenAI model to behave in an undesired manner, and in particular, to disclose PII.

Figure 1:
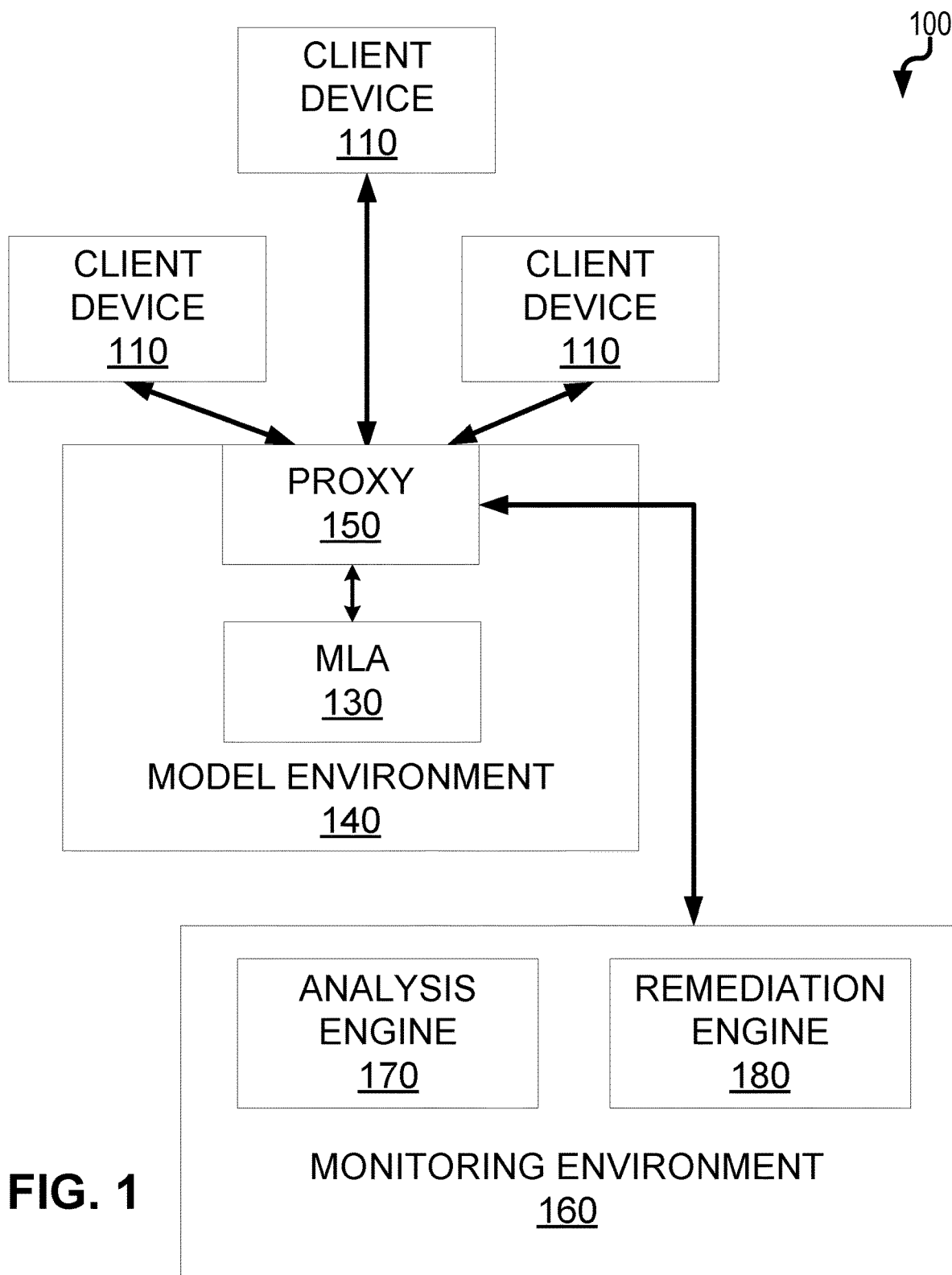
FIG. 1 is a system diagram illustrating a security platform for machine learning model architectures having a monitoring environment including an analysis engine and remediation engine.

FIG. 1 is a diagram 100 in which each of a plurality of client devices 110 (e.g., an endpoint computing device, a server, etc.) can query, over one or more networks, a machine learning model architecture (MLA) 130 forming part of a model environment 140. These queries can include or otherwise characterize various information including prompts (i.e., alphanumeric strings) or other text files. The model environment 140 can include one or more servers and data stores to execute the MLA 130 and process and respond to queries from the client devices 110. The MLA 130 can comprise or otherwise execute one or more GenAI models utilizing one or more of natural language processing, computer vision, and machine learning. Intermediate the MLA 130 and the client devices 110 is a proxy 150 which can analyze, intercept and/or modify inputs and/or outputs of the MLA 130.

The proxy 150 can communicate, over one or more networks, with a monitoring environment 160. The monitoring environment 160 can include one or more servers and data stores to execute an analysis engine 170. The analysis engine 170 can execute one or more of the algorithms/models described below with regard to the protection of the MLA 130.

The proxy 150 can, in some variations, relay received queries to the monitoring environment 160 prior to ingestion by the MLA 130. The proxy 150 can also or alternatively relay information which characterizes the received queries (e.g., excerpts, extracted features, metadata, etc.) to the monitoring environment 160 prior to ingestion by the MLA 130.

Figure 2:
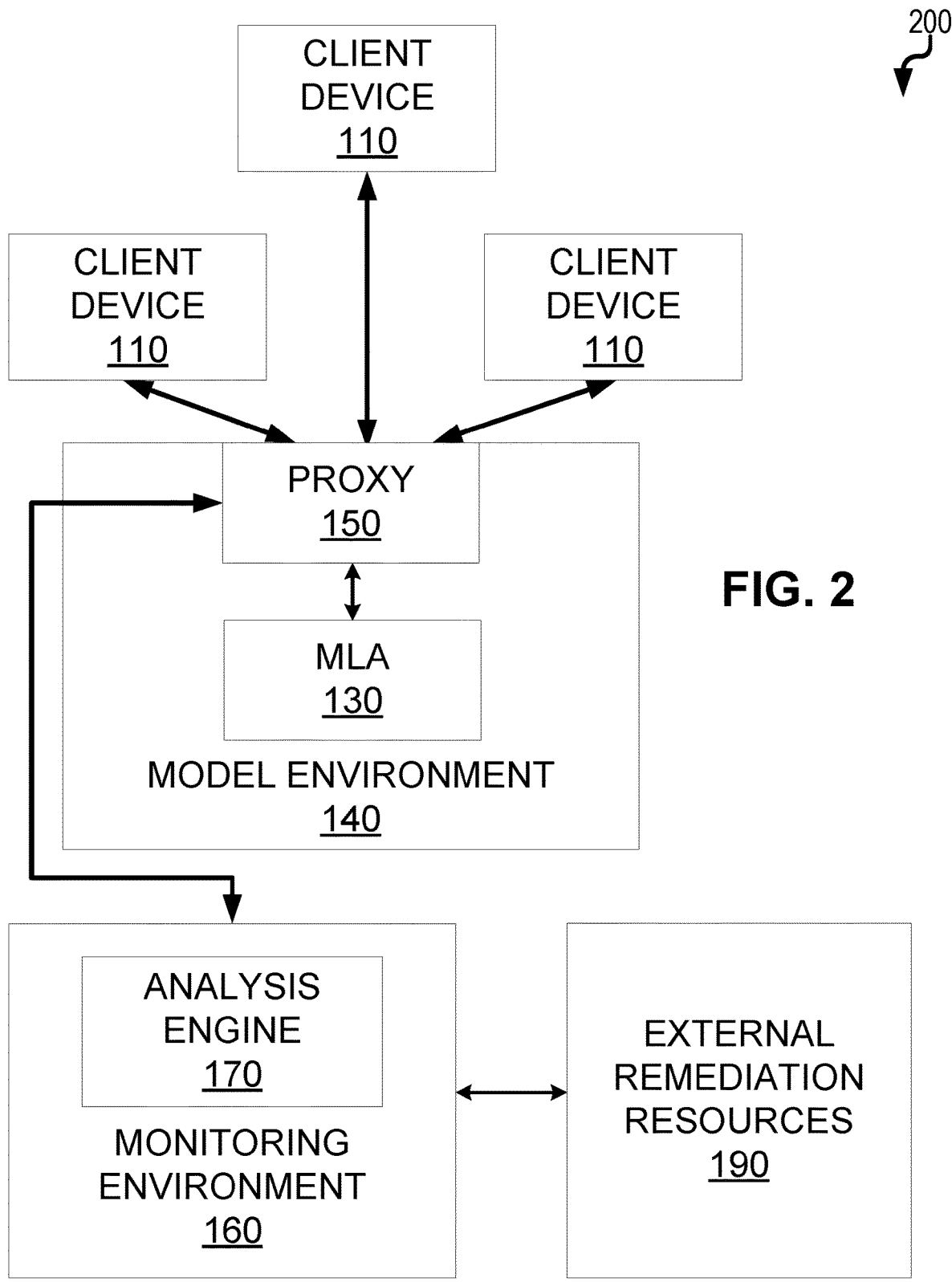
FIG. 2 is a system diagram illustrating a security platform for machine learning model architectures having a monitoring environment including an analysis engine which interfaces with external remediation resources.

The analysis engine 170 can analyze the relayed queries and/or information in order to make an assessment or other determination as to whether the queries are indicative of being malicious and/or whether the queries comprise or elicit PII from the MLA 130. In some cases, a remediation engine 180 which can form part of the monitoring environment 160 (or be external such as illustrated in FIG. 2) can take one or more remediation actions in response to a determination of a query as being malicious and/or as comprising or eliciting PII. These remediation actions can take various forms including transmitting data to the proxy 150 which causes the query to be blocked before ingestion by the MLA 130. In some cases, the remediation engine 180 can cause data to be transmitted to the proxy 150 which causes the query to be modified in order to be non-malicious, to remove PII, and the like. Such queries, after modification, can be ingested by the MLA 130 and the output provided to the requesting client device 110. In some variations, the output of the MLA 130 (after query modification) can be subject to further analysis by the analysis engine 170.

The proxy 150 can, in some variations, relay outputs of the MLA to the monitoring environment 160 prior to transmission to the respective client device 110. The proxy 150 can also or alternatively relay information which characterizes the outputs (e.g., excerpts, extracted features, metadata, etc.) to the monitoring environment 160 prior to transmission to the respective client device 110.

The analysis engine 170 can analyze the relayed outputs and/or information from the MLA 130 in order to make an assessment or other determination as to whether the queries are indicative of being malicious (based on the output alone or based on combination of the input and the output) and/or comprise PII. In some cases, the remediation engine 180 can, similar to the actions when the query analysis above, take one or more remediation actions in response to a determination of an output as resulting in undesired behavior by the MLA 130 (e.g., output is malicious and/or as comprises PII). These remediation actions can take various forms including transmitting data to the proxy 150 which causes the output of the MLA 130 to be blocked prior to transmission to the requesting client device 110. In some cases, the remediation engine 180 can cause data to be transmitted to the proxy 150 which causes the output for transmission to the requesting client device 110 to be modified in order to be non-malicious, to remove PII, and the like.

FIG. 2 is a diagram 200 in which each of a plurality of client devices 110 (e.g., an endpoint computing device, a server, etc.) can query, over one or more networks, a machine learning model architecture (MLA) 130 forming part of a model environment 140. These queries can include or otherwise characterize various information including prompts (i.e., alphanumeric strings) or other text files. The model environment 140 can include one or more servers and data stores to execute the MLA 130 and process and respond to queries from the client devices 110. The MLA 130 can comprise or otherwise execute one or more GenAI models utilizing one or more of natural language processing, computer vision, and machine learning. Intermediate the MLA 130 and the client devices 110 is a proxy 150 which can analyze, intercept and/or modify inputs and/or outputs of the MLA 130.

FIG. 2 is a system diagram 200 illustrating a security platform for machine learning model architectures having a configuration in which the monitoring environment 160 includes an analysis engine 170 which interfaces with external remediation resources 190. In this variation, the monitoring environment 160 does not include a remediation engine 180 but rather communicates, via one or more networks, with external remediation resources 190. The external remediation resources 190 can be computing devices or processes which result in actions such as blocking future requests at the network or user level and/or initiating a remediation action which closes off the impacted system until the malicious action or undesired behavior (e.g., disclosure of PII, etc.) which was output is considered ineffective.

Figure 3:
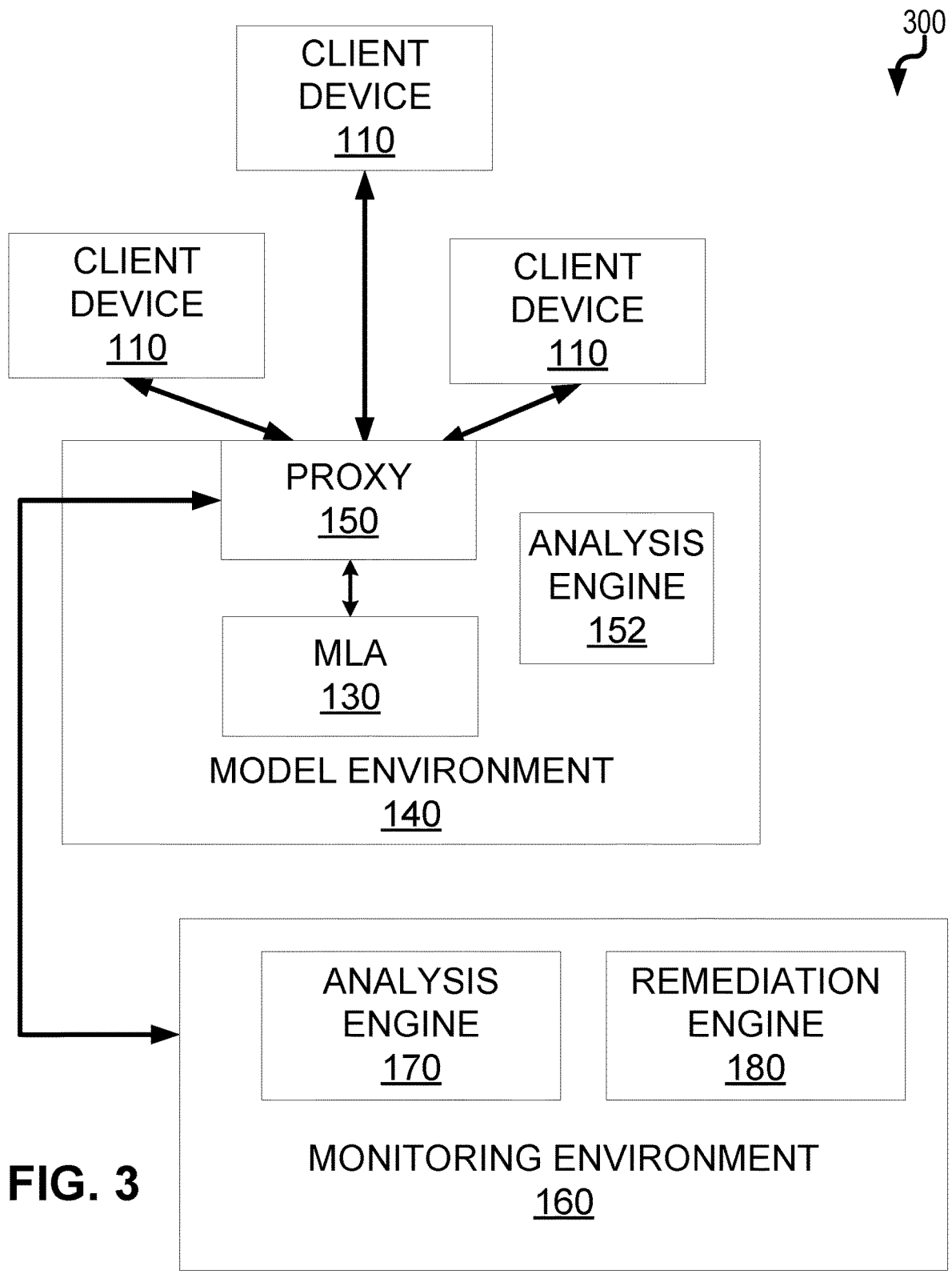
FIG. 3 is a system diagram illustrating a security platform for machine learning model architectures having a model environment having a local analysis engine and a monitoring environment including an analysis engine and a remediation engine.

FIG. 3 is a system diagram 300 illustrating a security platform for machine learning model architectures having a configuration in which the model environment 140 includes a local analysis engine 152 and the monitoring environment 160 includes both an analysis engine 170 and a remediation engine 180. In some cases, one or more of the analysis engine 152 and the remediation engine 180 can be encapsulated or otherwise within the proxy 150. In this arrangement, the local analysis engine 152 can analyze inputs and/or outputs of the MLA 130 in order to determine, for example, whether to pass on such inputs and/or outputs to the monitoring environment 160 for further analysis. For example, the local analysis engine 152 can provide a more computationally efficient local screening of inputs and/or outputs using various techniques as provided herein and optionally, using more lightweight models. If the analysis engine 152 determines that an input or output of the MLA requires further analysis, the input or output (or features characterizing same) are passed to the monitoring environment 160 which can, for example, execute more computationally expensive models (e.g., an ensemble of models, etc.) using the analysis engine 170.

Figure 4:
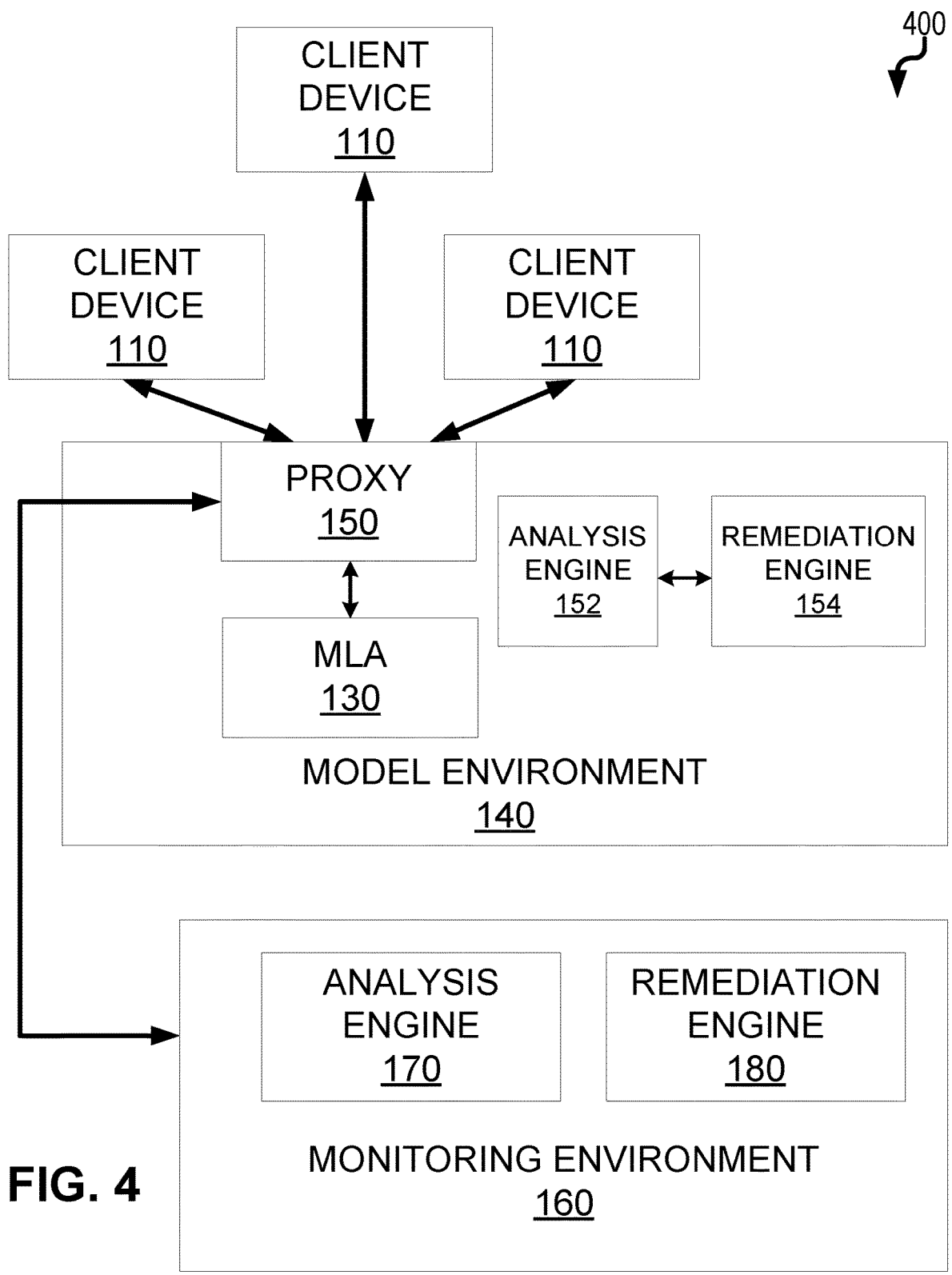
FIG. 4 is a system diagram illustrating a security platform for machine learning model architectures having a model environment having a local analysis engine and a local remediation engine and a monitoring environment including an analysis engine and a remediation engine.

FIG. 4 is a system diagram 400 illustrating a security platform for machine learning model architectures having a configuration in which the model environment includes both a local analysis engine 152 and a local remediation engine 154. The monitoring environment 160, in this variation, can include an analysis engine 170 and a remediation engine 180. In this arrangement, the local analysis engine 152 can analyze inputs and/or outputs of the MLA 130 in order to determine, for example, whether to pass on such inputs and/or outputs to local remediation engine 154 to take an affirmative remedial action such as blocking or modifying such inputs or outputs. In some cases, the local analysis engine 152 can make a determination to bypass the local remediation engine 154 and send data characterizing an input or output of the MLA 130 to the monitoring environment 160 for further actions (e.g., analysis and/or remediation, etc.). The local remediation engine 154 can, for example, handle simpler (i.e., less computationally expensive) actions while, in some cases, the remediation engine 180 forming part of the monitoring environment 160 can handle more complex (i.e., more computationally expensive) actions.

Figure 5:
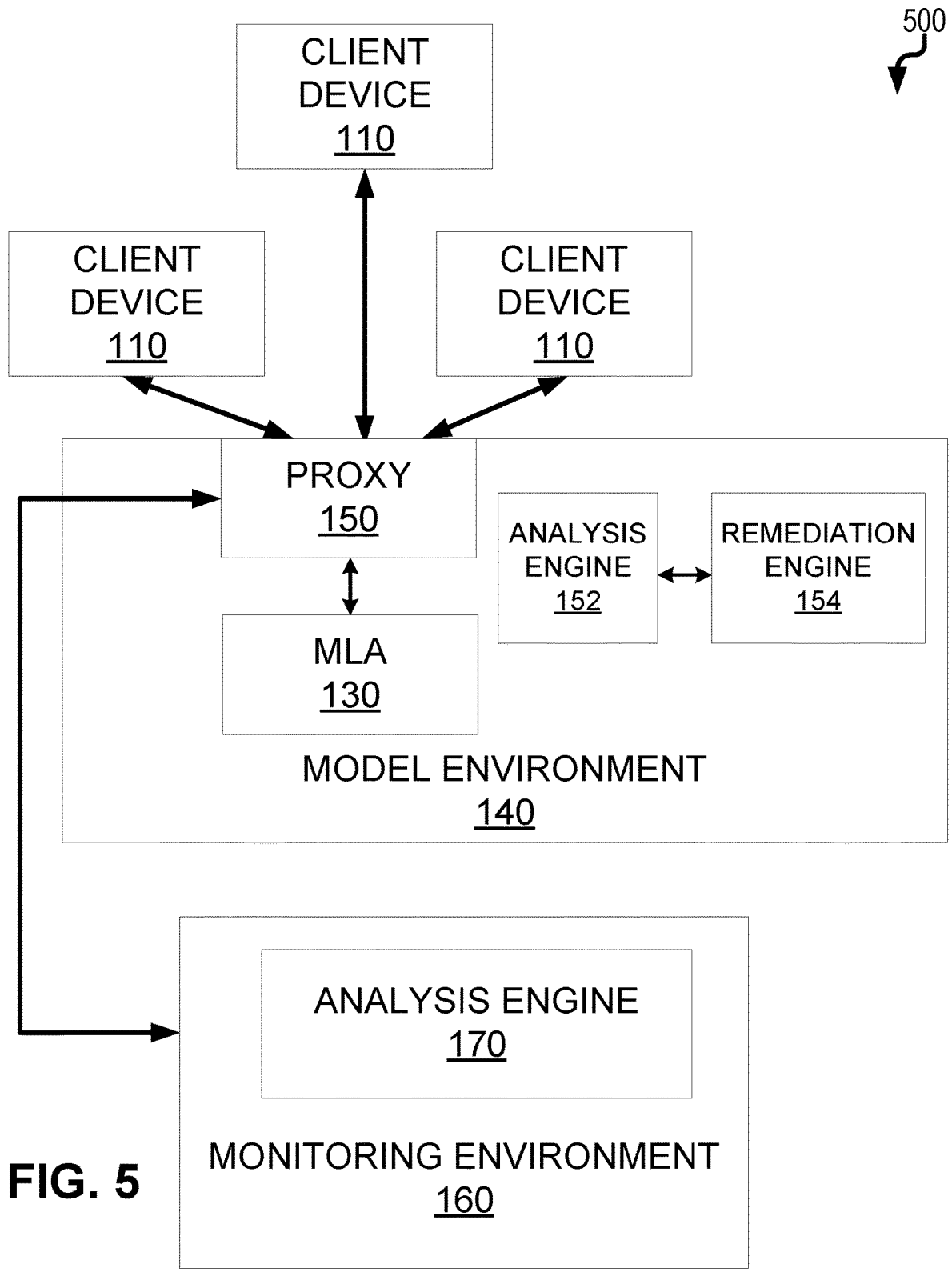
FIG. 5 is a system diagram illustrating a security platform for machine learning model architectures having a model environment having a local analysis engine and a local remediation engine and a monitoring environment including an analysis engine.

FIG. 5 is a system diagram 500 illustrating a security platform for machine learning model architectures in which the model environment 140 includes a local analysis engine 152 and a local remediation engine 154 and the monitoring environment 160 includes an analysis engine 170 (but does not include a remediation engine). With such an arrangement, any remediation activities occur within or are triggered by the local remediation engine 154 in the model environment 140. These activities can be initiated by the local analysis engine 152 and/or the analysis engine 170 forming part of the monitoring environment. In the latter scenario, a determination by the analysis engine 170 results in data (e.g., instructions, scores, etc.) being sent to the model environment 140 which results in remediation actions.

Figure 6:
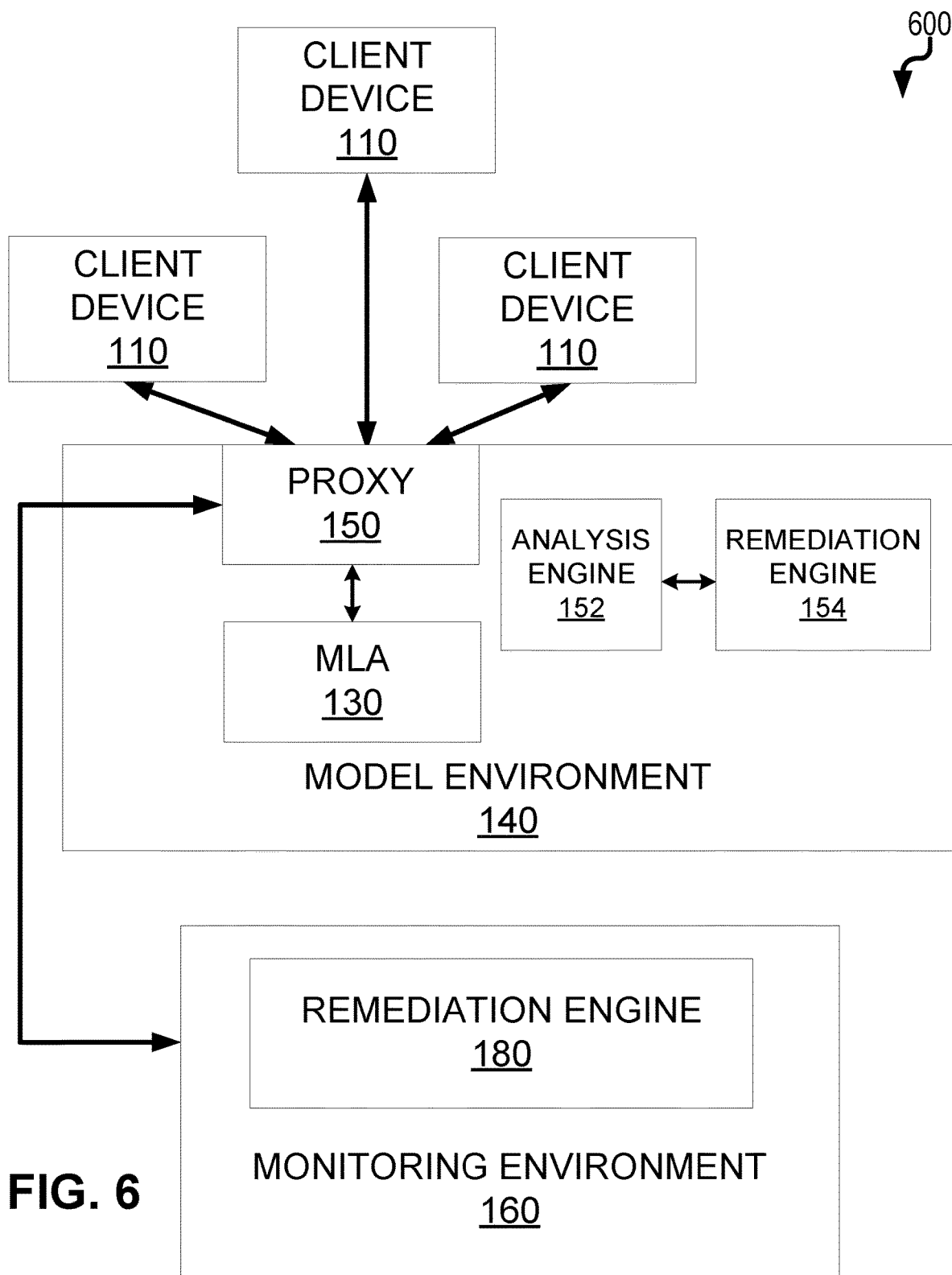
FIG. 6 is a system diagram illustrating a security platform for machine learning model architectures having a model environment having a local analysis engine and a local remediation engine and a monitoring environment including a remediation engine.

FIG. 6 is a system diagram 600 illustrating a security platform 600 for machine learning model architectures in which the model environment 140 includes a local analysis engine 152 and a local remediation engine 154 and the monitoring environment 160 includes a remediation engine 180 (but not an analysis engine). With this arrangement, analysis of inputs or outputs is performed in the model environment by the local analysis engine 152. In some cases, remediation can be initiated or otherwise triggered by the local remediation engine 154 while, in other scenarios, the model environment 140 sends data (e.g., instructions, scores, etc.) to the monitoring environment 160 so that the remediation engine 180 can initiate one or more remedial actions.

Figure 7:
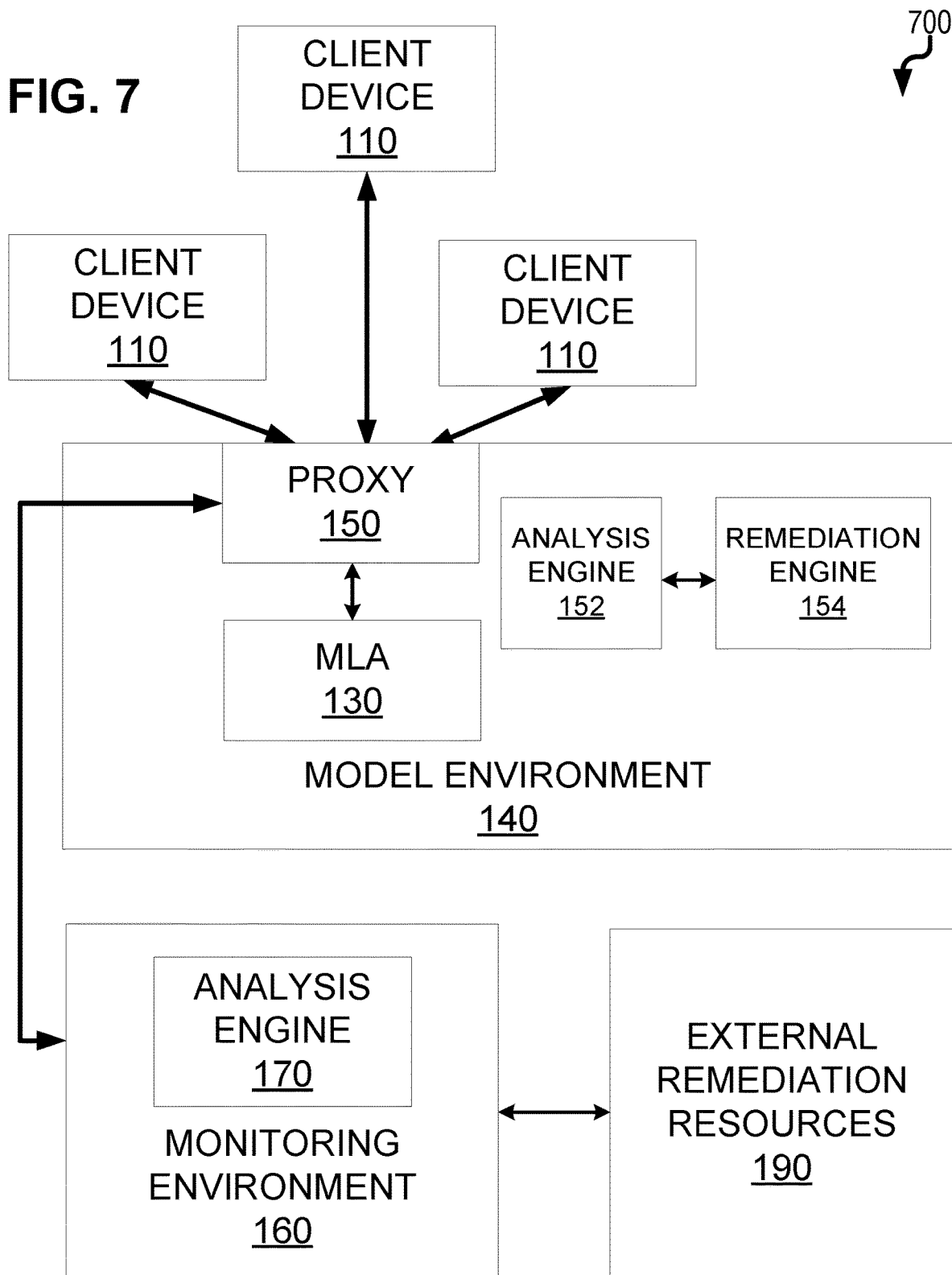
FIG. 7 is a system diagram illustrating a security platform for machine learning model architectures having a model environment having a local analysis engine and a local remediation engine and a monitoring environment including an analysis engine which interfaces with external remediation resources.

FIG. 7 is a system diagram 700 illustrating a security platform for machine learning model architectures in which the model environment 140 has a local analysis engine 152 and a local remediation engine 154 while the monitoring environment 160 includes an analysis engine 170 which interfaces with external remediation resources 190. With this arrangement, remediation can be initiated or otherwise triggered by the local remediation engine 154 and/or the external remediation resources 190. With the latter scenario, the monitoring environment 160 can send data (e.g., instructions, scores, etc.) to the external remediation resources 190 which can initiate or trigger the remediation actions.

Figure 8:
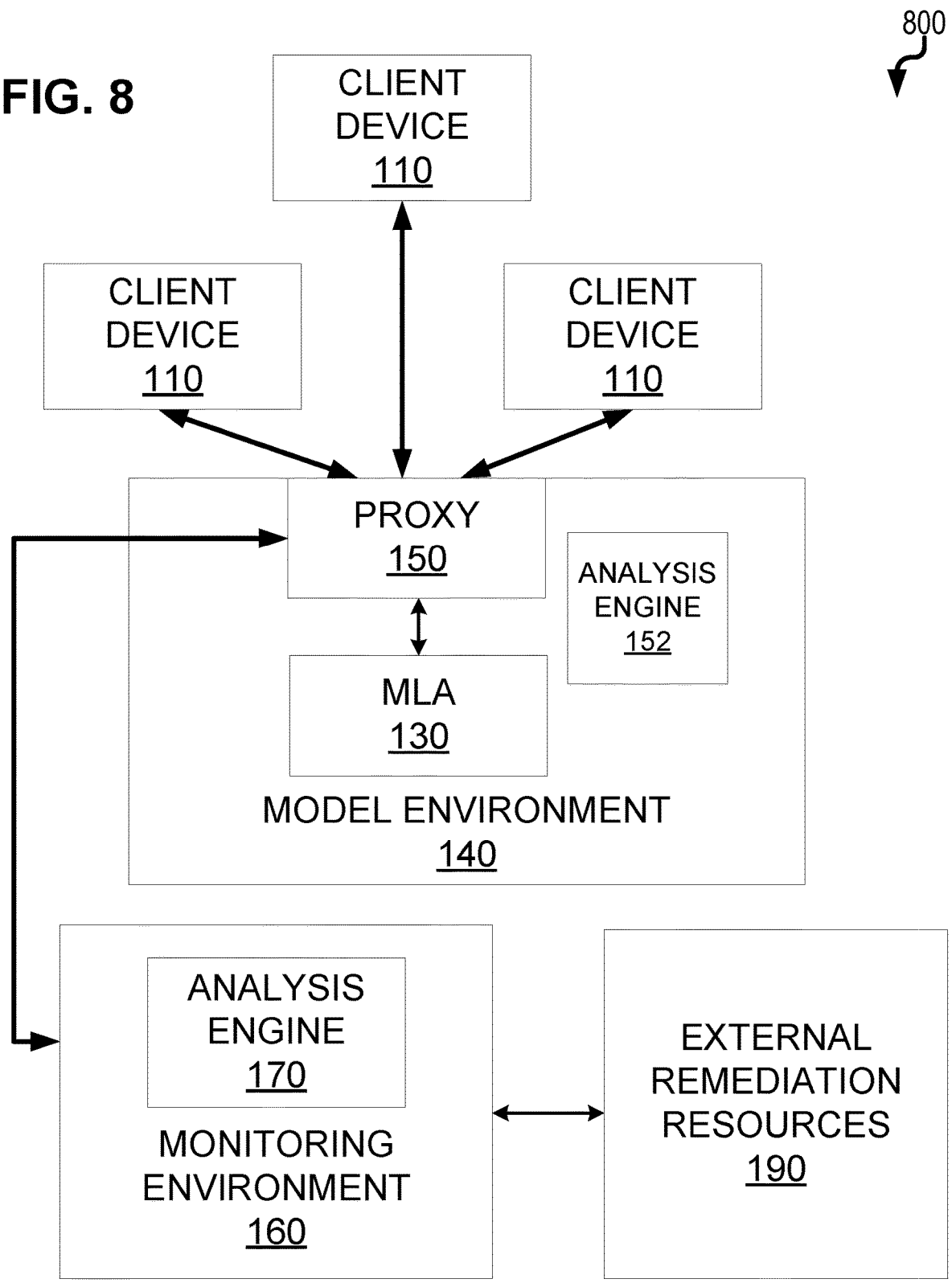
FIG. 8 is a system diagram illustrating a security platform for machine learning model architectures having a model environment having a local analysis engine and a monitoring environment including an analysis engine which interfaces with external remediation resources.

FIG. 8 is a system diagram 800 illustrating a security platform for machine learning model architectures in which the model environment 140 includes a local analysis engine 152 and the monitoring environment 160 includes an analysis engine 170 (but does not include a remediation engine). In this arrangement, analysis can be conducted in the monitoring environment 160 and/or the model environment 140 by the respective analysis engines 152, 170 with remediation actions being triggered or initiated by the external remediation resources 190.

Figure 9:
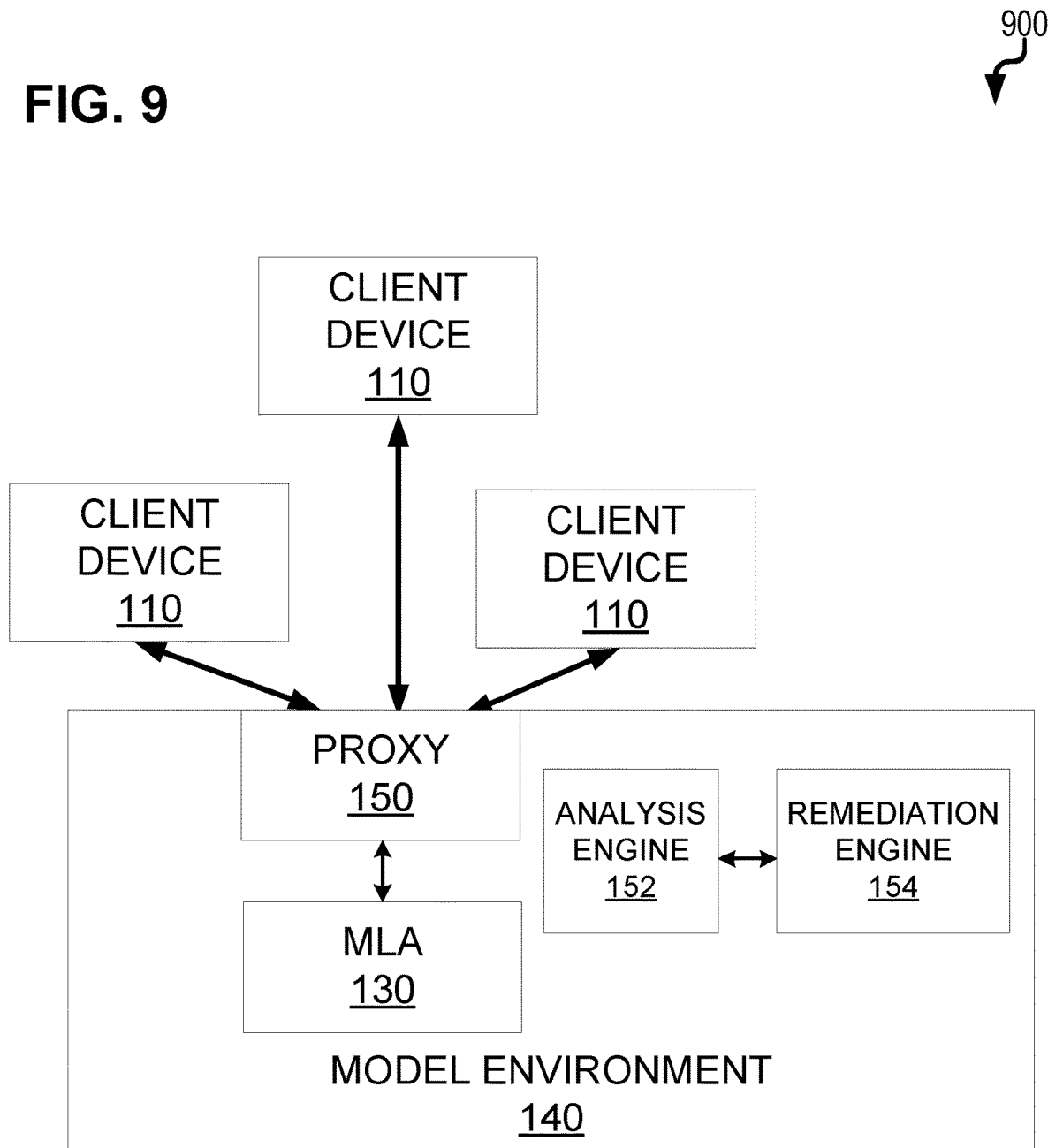
FIG. 9 is a system diagram illustrating a security platform for machine learning model architectures having a model environment including a local analysis engine and remediation engine.

FIG. 9 is a system diagram 900 illustrating a security platform for machine learning model architectures having a model environment 140 including a local analysis engine 152 and a local remediation engine 154. In this arrangement, the analysis and remediation actions are taken wholly within the model environment (as opposed to a cloud-based approach involving the monitoring environment 160 as provided in other variations).

Figure 10:
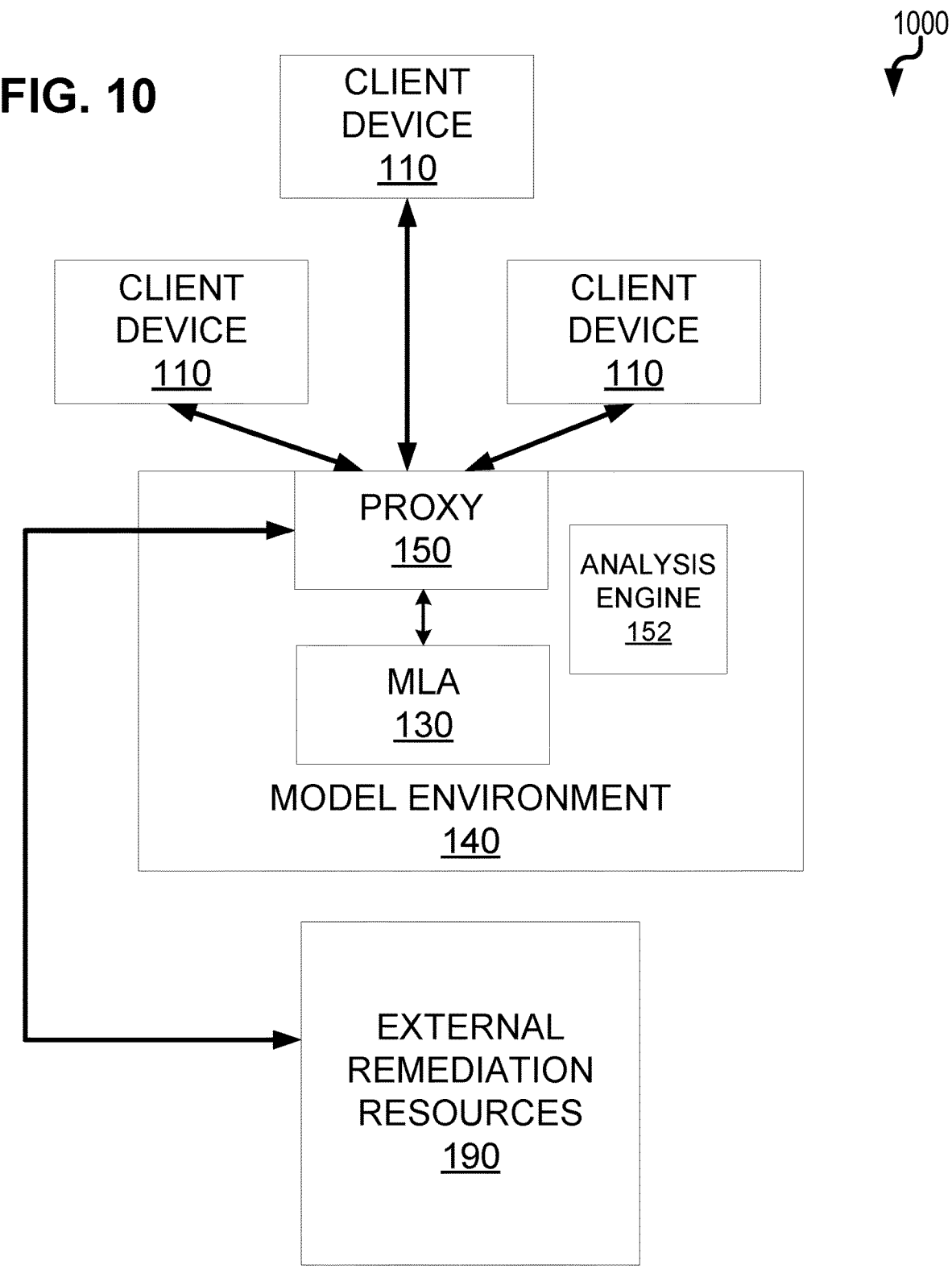
FIG. 10 is a system diagram illustrating a security platform for machine learning model architectures having a model environment including a local analysis engine which interfaces with external remediation resources

FIG. 10 is a system diagram illustrating a security platform for machine learning model architectures having a model environment 140 including a local analysis engine 152 which interfaces with external remediation resources 190. In this variation, the analysis of inputs/prompts is conducted local within the model environment 140. Actions requiring remediation are then initiated or otherwise triggered by external remediation resources 190 (which may be outside of the monitoring environment 160) such as those described above.

One or both of the analysis engines 152, 170 can analyze the prompts to determine whether the prompt contains or elicits PII from the MLA 130. Similarly, one or both of the analysis engines 152, 170 can analyze outputs of the MLA 130 to determine whether comprise PII. In some cases, the analysis engines 152, 170 can locally execute pattern recognition algorithms to identify whether there are any entities in the prompt and/or output which are indicative of PII. The pattern recognition algorithms can be, for example, Luhn Algorithms to recognize credit card, IMEI, NPI, and various national ID numbers; regular expressions to recognize SSNs, telephone numbers, and email addresses, in their various forms; a machine learning model trained and configured for recognizing addresses and other entities indicative of PII. In some variations, one or more of the analysis engines 152, 170 can interact with a remote service which can conduct the pattern recognition algorithms. If PII is found or elicited in a prompt, the prompt can be deleted, modified (e.g., redacted, etc.), or otherwise flagged for further analysis. If PII is found within an output, the prompt can be deleted, modified (e.g., redacted, etc.) or otherwise flagged for further analysis. Data characterizing the determination (e.g., whether or not PII is implicated by the prompt and/or output, etc.) can be provided to a consuming application or process (which can take remediation actions if triggered).

The pattern recognition can take varying forms including a set of regular expressions devised to identify specific PII such as phone numbers, SSNs, and the like. The pattern recognition can additionally include a machine learning model configured and trained to identify PII in context. In particular, the machine learning model can be trained with sufficient sentences with context that it could distinguish when an input or output including a PII entity type is permissible to convey or requires other remediation actions (e.g., redaction, deletion, modification, etc.).

As an example, one token that might be a phone number (or is known to be) can be associated with a subject that appears "private" and therefore should be redacted/detected.

As a further example, only of the two sentences below is problematic with regard to PII.

First sentence: "I'm Dave, the VP of HiddenLayer, my office number is +1.123.456.7890"

Second sentence: "Harley, cancer patient in room 5, cell phone +1.234.567.8911"

The combination of the regular expressions and the machine learning model will detect both the phone numbers, the names, and the diagnosis (in the second sentence); however, the machine learning model will only flag the second sentence for comprising PII.

The result is that the 1st sentence should be left unaltered. The second sentence can be altered/redacted in a fashion such as "<PERSON>, <HIPAA> in room 5, cell phone <PHONE NUMBER>".

In some variations, the PII entity analysis above can be used in connection with a blocklist which conducts a further analysis on the prompt and/or output to characterize whether such prompt and/or output are causing the MLA 130 to behave in an undesired manner (e.g., allow unauthorized access, disclose PII or other sensitive information, etc.). Such a blocklist can leverage historical prompts that are known to be malicious (e.g., used for prompt injection attacks, etc.) and/or, in some variations, leverage prompts known to include PII. The goal of a prompt injection attack would be to cause the MLA 130 to ignore previous instructions (i.e., instructions predefined by the owner or developer of the MLA 130, etc.) or perform unintended actions based on one or more specifically crafted prompts. The historical prompts can be from, for example, an internal corpus and/or from sources such as an open source malicious prompt list in which the listed prompts have been confirmed as being harmful prompt injection prompts. Similarly, if PII is being analyzed, the blocklist can be generated from historical prompts known to contain PII such as financial or personally identification information.

The current subject matter can be used to identify and, in some cases, take remedial actions from prompts or other inputs which are indicative of an attack (e.g., an attempt to obtain PII or otherwise manipulate an output of the MLA 130). Example attacks include: direct task deflection, a special case attack, a context continuation attack, a context termination attack, a syntactic transformation attack, an encryption attack, a text redirection attack and the like. A direct task deflection attack can include, for example, assigning the MLA 130 a persona unrelated to its original purpose and directing it to do something is not intentionally intended to do. A special case attack can include attempts to obfuscate malicious prompts by injecting special case characters randomly or methodically, to confuse the MLA 130 to output a malicious response. A context continuation attack can include providing the MLA 130 with a single prompt or multiple prompts which follow some permutation of a pattern like: benign prompt, malicious prompt, benign prompt, continuation of malicious prompt and which, in combination, can trigger a malicious output. A context termination attack can include provoking a malicious response from the MLA 130 by providing a context and requesting the MLA 130 to essentially "fill in the blanks". A syntactic transformation attack can include manipulation of the syntax or structure of an input to trigger or otherwise stimulate a malicious response. An encryption attack can include encrypting the prompt and tasking the MLA 130 to decrypt the prompt specifying the encryption method. A text redirection attack can include manipulating or redirecting the flow of text-based communications between users or systems.

The blocklist can be derived from data sources based on the desired functionality (e.g., malicious content, PII, etc.). With regard to attacks, as an example, the blocklist can be derived by running a natural language processing (NLP) analysis on a corpus of prompts. The blocklist, once generated, can be used to prevent or flags prompts using strings or tokens that have been identified as having the highest frequency of usage in the malicious prompt corpus. Similarly, with regard to the protection of PII, the blocklist can be derived by running an NLP analysis using a corpus of prompts that are known to include PII.

One or both of the analysis engines 152, 170 can utilize at least one blocklist (such as those described above) when making the determination of whether the output of the MLA 130 contains information indicative of a malicious attack and/or contains PII. This blocklist can leverage historical outputs of the MLA 130 or simulated outputs that are indicative of being part of a malicious attack (e.g., used for prompt injection attacks, etc.) and/or, in some variations, leverage historical outputs of the MLA 130 or simulated outputs that are known to include PII. Monitoring the outputs of the MLA 130 can also help thwart attacks such as a prompt injection attack in cases in which the corresponding prompts were not blocked, modified or otherwise flag. The outputs can be from, for example, an internal corpus and/or from sources such as an open source corpus of malicious model outputs (e.g., GenAI model outputs in particular). Similarly, if PII is being analyzed, the blocklist can be generated from outputs known to contain PII such as financial or personally identification information.

Figure 11:
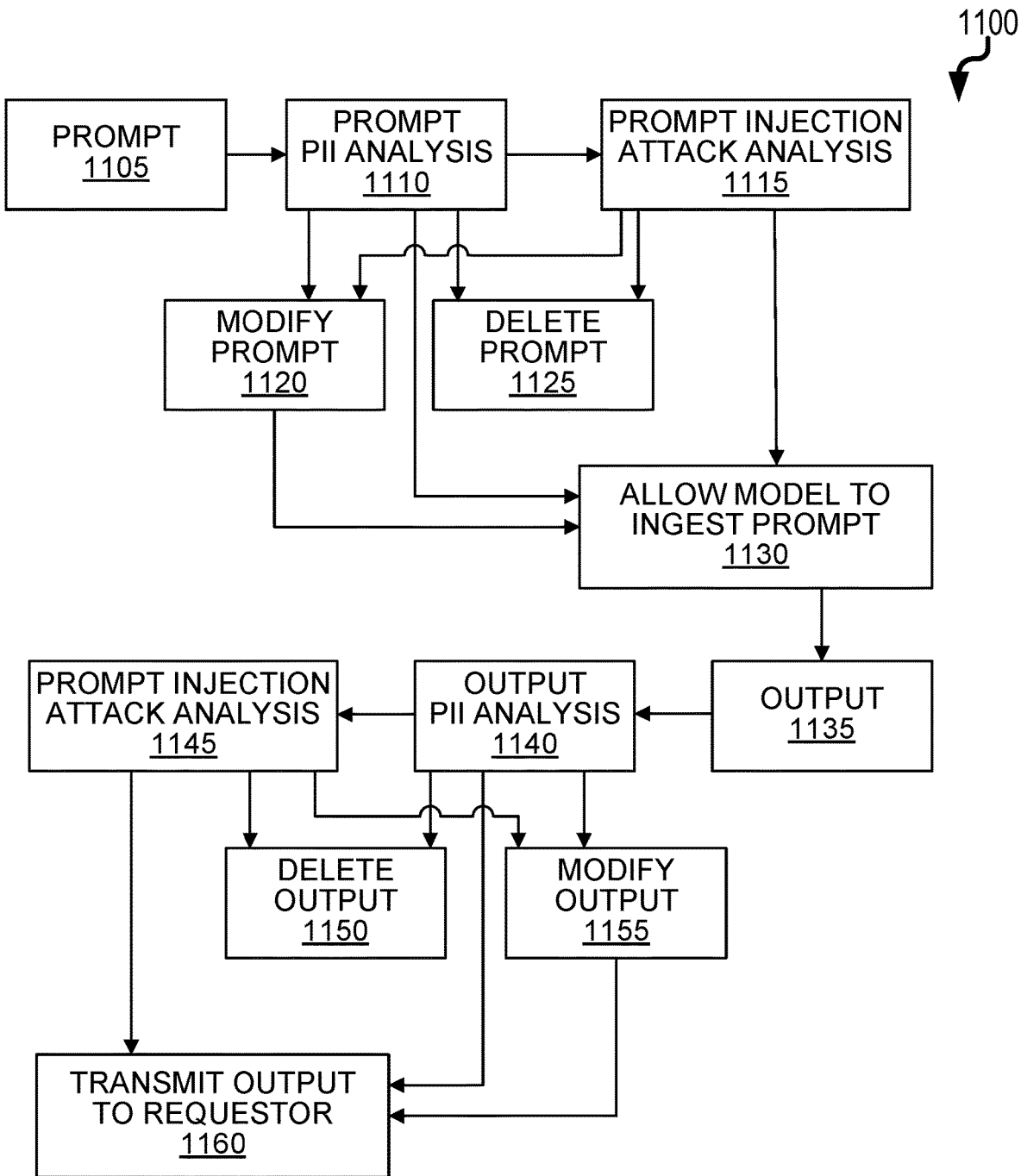
FIG. 11 is a process flow diagram illustrating monitoring of prompts and outputs of a machine learning architecture for PII and/or malicious content.

FIG. 11 is a diagram 1100 illustrating processes for analyzing both prompts and outputs. Initially, a prompt 1105 is received (e.g., intercepted, accessed, etc.) from a requestor which then triggers a prompt PII analysis 1110. The PII analysis 1110 can use various techniques to determine whether the prompt comprises or elicits PII including pattern recognition and the like. If the PII analysis 1110 determines that the prompt comprises or elicits PII then various remediation actions can be undertaken such as the prompt being modified (e.g., redacted, truncated, strings are replaced, etc.) 1120 or the prompt being deleted 1125. In some cases, the PII analysis 1110 can assign thresholds regarding PII content within the prompt to trigger either the prompt modification 1120 or deletion of the prompt 1125. For example, a single reference to PII or a single PII entity might trigger a modification, while multiple references might trigger deletion. In addition to the PII analysis 1110, a prompt injection attack analysis 1115 can analyze the prompt to determine whether the prompt comprises or elicits some sort of prompt injection attack. The prompt injection attack analysis 1115, while pictured as being in sequence after the PII analysis 1110, can occur in parallel or prior to the PII analysis 1110 depending on the desired configuration. The prompt injection attack analysis 1115 can also cause remediations actions such a prompt modification 1120 or prompt detection 1125. Various rules can be executed to determine which of these two particular actions are undertaken if at all.

Depending on the workflow, the original prompt 1105 or the modified prompt 1120 is then ingested by the model 1130 (e.g., machine learning model architecture, etc.) which results in an output 1135. A PII analysis 1140 can be performed on the output 1135 using the same or similar techniques as described above to determine whether the output 1135 requires deletion 1150 or modification 1155 (e.g., redaction, truncation, string replacement, etc.) or whether the output can be transmitted to the requestor 1160. Similarly, a prompt injection analysis 1145 can be performed using the same or similar techniques as described above to determine whether the output comprises undesired model behavior such as might be caused by a prompt injection attack. The output of the prompt injection analysis 1145 can be used to determine whether the output 1135 requires deletion 1150 or modification 1155 (e.g., redaction, truncation, string replacement, etc.) or whether the output can be transmitted to the requestor 1160.

Figure 12:
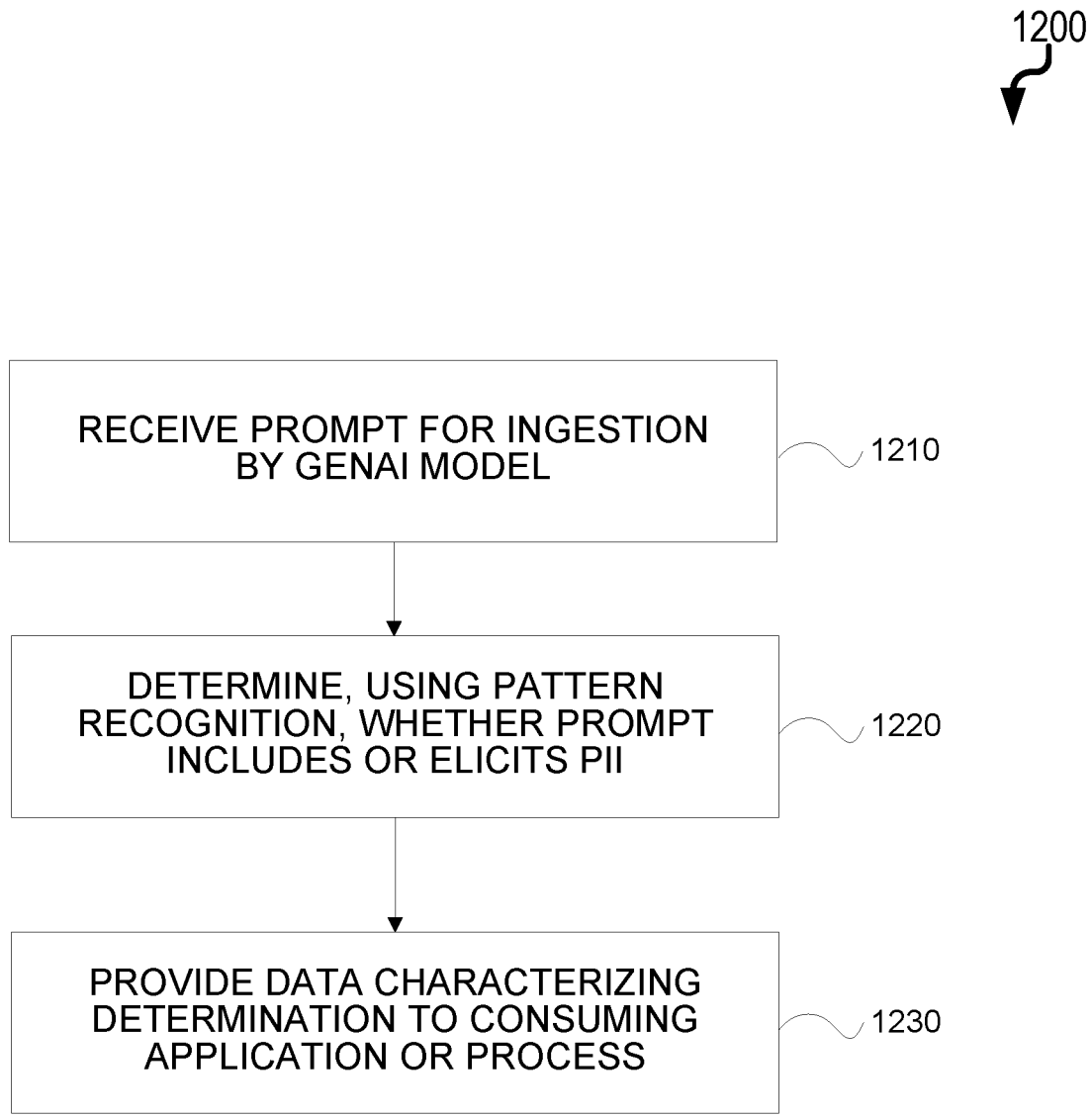
FIG. 12 is a process flow diagram illustrating monitoring of prompts of a machine learning architecture for PII or for strings which elicit PII.

FIG. 12 is a process flow diagram 1200 in which, at 1210, data is received (e.g., by an analysis engine or other service) which characterizes a prompt for ingestion by a machine learning model (e.g., GenAI model, etc.). Thereafter, at 1220, it is determined (e.g. by the analysis engine or other service) whether the prompt comprises PII or elicits PII from the machine learning model. This determination can be based on, for example, pattern recognition to identify PII entities in the prompt (which are indicative of the prompt comprising PII). Thereafter, at 1230, data characterizing the determination can be provided to a consuming application or process.

Figure 13:
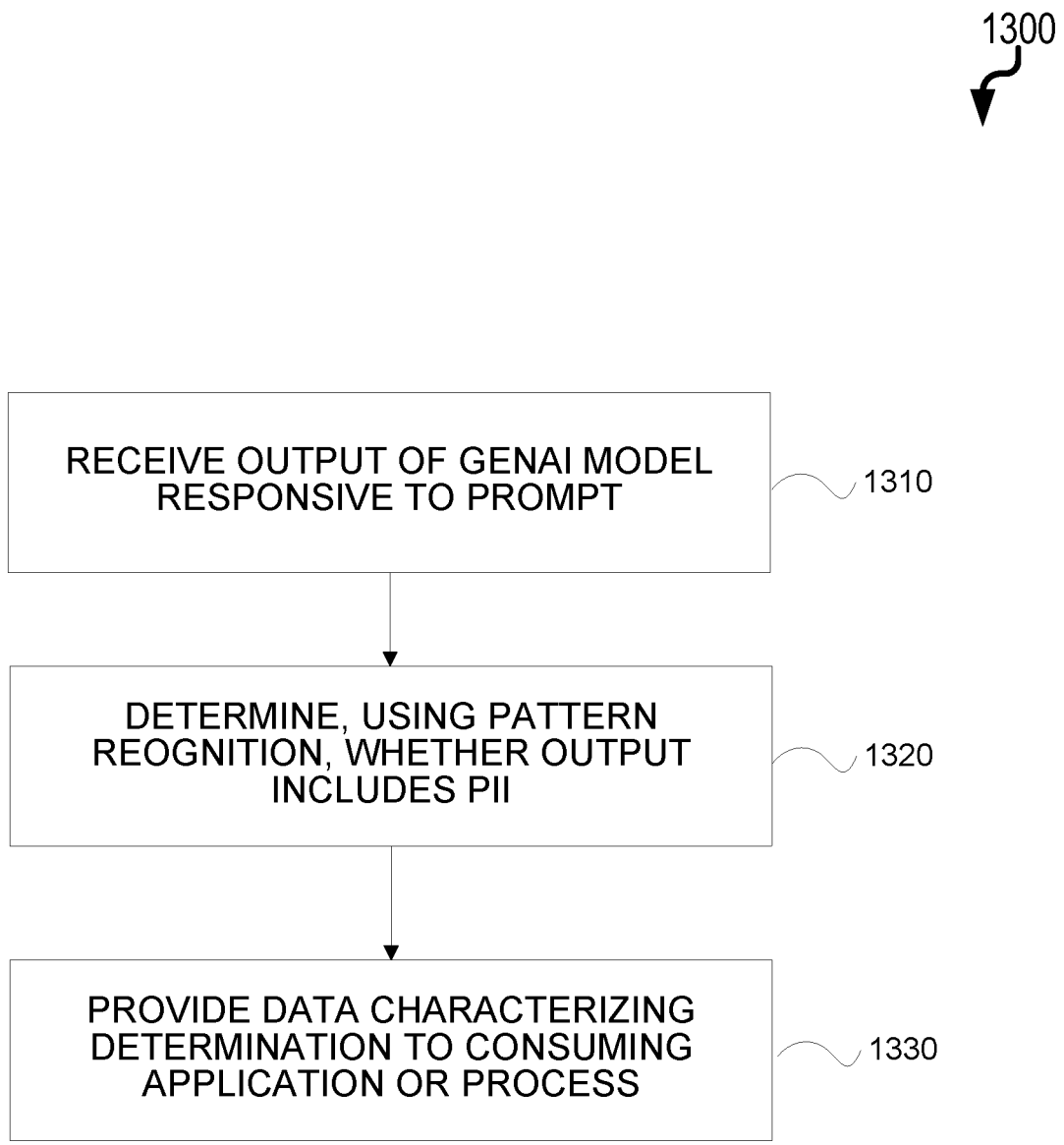
FIG. 13 is a process flow diagram illustrating monitoring of outputs of a machine learning architecture for PII.

FIG. 13 is a process flow diagram 1300 in which, at 1310, data is received (e.g., by an analysis engine or other service) which characterizes an output of a machine learning model (e.g., GenAI model, etc.). Thereafter, at 1320, it is determined (e.g. by the analysis engine or other service) whether the output comprises personally identifiable information. This determination can be based on, for example, pattern recognition to identify PII entities in the output. Thereafter, at 1330, data characterizing the determination can be provided to a consuming application or process.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor (e.g., CPU, GPU, etc.), which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computing device having a display device (e.g., a LED or LCD (liquid crystal display) monitor) for displaying information to the user and a keyboard and an input device (e.g., mouse, trackball, touchpad, touchscreen, etc.) by which the user may provide input to the computing device. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:

receiving, from a proxy executing in a model environment, data characterizing a prompt for ingestion by a generative artificial intelligence (GenAI) model executing in the model environment;

calling a remote service to identify, using each of a plurality of pattern recognition algorithms and a first machine learning model, personally identifiable information (PII) entities in the prompt, wherein each of the identified PII entities are classified as one of a plurality of PII entity types, determining, by the remote service, whether aspects of the prompt comprise permissible or impermissible PII based on the PII entity type and context associated with the prompt;

providing data characterizing the determination of whether aspects of the prompt comprises permissible or impermissible PII to a consuming application or process, the consuming application or process taking remediation actions in connection with the aspects of the prompt that comprise impermissible PII while not modifying the aspects of the prompt that comprise permissible PII;

receiving an output of the GenAI model in response to the prompt, when it is determined that the prompt does not comprise impermissible PII;

determining, by the remote service, using the plurality of pattern recognition algorithms and a second machine learning model, whether the output comprises permissible PII or impermissible PII;

determining whether the output indicates that the prompt contained or elicited malicious content or undesired behavior by the GenAI model based on a similarity analysis between a blocklist and the received data, the blocklist being derived from a corpus of machine learning model outputs responsive to malicious prompts;

allowing the output to be transmitted to a requesting user when it is determined that the output does not comprise impermissible PII and it is determined that the output does not indicate that the prompt contained or elicited malicious content or undesired behavior;

preventing the output from being transmitted to a requestor when it is determined that the output comprises impermissible PII; and preventing the output from being transmitted to a requestor when it is determined that the output indicates that the prompt contained or elicited malicious content or undesired behavior.

2. The method of claim 1 further comprising:
classifying the identified PII entities as one of a plurality of entity types using at least one third machine learning model.

3. The method of claim 2 further comprising:
initiating at least one remediation action corresponding to the entity type to modify or block the prompt.

4. The method of claim 1 wherein the GenAI model comprises a large language model.

5. The method of claim 1, wherein the consuming application or process allows the prompt to be input into the GenAI model upon a determination that the prompt does not comprise impermissible PII.

6. The method of claim 1, wherein the consuming application or process prevents the prompt from being input into the GenAI model upon a determination that the prompt comprises impermissible PII.

7. The method of claim 1, wherein the consuming application or process flags the prompt as comprising PII for quality assurance upon a determination that the prompt comprises impermissible PII.

8. The method of claim 1, wherein the consuming application or process modifies the prompt to remove or redact the impermissible PII upon a determination that the prompt comprises impermissible PII and causes the modified prompt to be ingested by the GenAI model.

9. The method of claim 1 further comprising:
determining, using a blocklist, whether the prompt comprises or elicits undesired behavior from the GenAI model.

10. The method of claim 9 further comprising:
preventing the prompt from being ingested by the GenAI model when it is determined using the blocklist that the prompt comprises or elicits undesired behavior from the GenAI model.

11. The method of claim 10 further comprising:
modifying the prompt to be benign when it is determined using the blocklist that the prompt comprises or elicits undesired behavior from the GenAI model; and
causing the modified prompt to be ingested by the GenAI model.

12. The method of claim 1, wherein natural language processing is used to identify and extract strings belonging to specific entity types likely to comprise PII.

13. The method of claim 1 further comprising:
causing the prompt to be ingested by the GenAI model after completion of the remediation actions.

14. The method of claim 1, wherein the first machine learning model is same as the second machine learning model.

15. The method of claim 1, wherein the first machine learning model is trained and configured to analyze prompts of the GenAI model and the second machine learning model is trained and configured to analyze outputs of the GenAI model.

16. A system comprising:
at least one hardware processor; and
memory storing instructions which, when executed by the at least one hardware processor, result in operations comprising:
receiving, from a proxy executing in a model environment, data characterizing a prompt for ingestion by a generative artificial intelligence (GenAI) model executing in the model environment;
calling a remote service to identify, using each of a plurality of pattern recognition algorithms and at least one machine learning model, personally identifiable information (PII) entities in the prompt, wherein each of the identified PII entities are classified as one of a plurality of PII entity types,
determining, by the remote service, whether aspects of the prompt comprise permissible PII or impermissible PII based on the PII entity type and context associated with the prompt;
providing data characterizing the determination of whether aspects of the prompt comprises permissible or impermissible PII to a consuming application or process, the consuming application or process taking remediation actions in connection with the aspects of the prompt that comprise impermissible PII while not modifying the aspects of the prompt that comprise permissible PII;
receiving an output of the GenAI model in response to the prompt, when it is determined that the prompt does not comprise impermissible PII;
determining, by the remote service, using the plurality of pattern recognition algorithms and the at least one machine learning model, whether the output comprises permissible PII or impermissible PII;
determining whether the output indicates that the prompt contained or elicited malicious content or undesired behavior by the GenAI model based on a similarity analysis between a blocklist and the received data, the blocklist being derived from a corpus of machine learning model outputs responsive to malicious prompts;
allowing the output to be transmitted to a requesting user when it is determined that the output does not comprise impermissible PII and it is determined that the output does not indicate that the prompt contained or elicited malicious content or undesired behavior;
preventing the output from being transmitted to a requestor when it is determined that the output comprises impermissible PII; and
preventing the output from being transmitted to a requestor when it is determined that the output indicates that the prompt contained or elicited malicious content or undesired behavior.

17. The system of claim 16, wherein the operation further comprise:
classifying the identified PII entities as one of a plurality of entity types using at least one machine learning model.

18. The system of claim 17, wherein the operations further comprise:

initiating at least one remediation action corresponding to the entity type to modify or block the prompt.

19. The system of claim 16 wherein the GenAI model comprises a large language model.

20. The system of claim 16, wherein the consuming application or process allows the prompt to be input into the GenAI model upon a determination that the prompt does not comprise impermissible PII.

21. The system of claim 16, wherein the consuming application or process prevents the prompt from being input into the GenAI model upon a determination that the prompt comprises impermissible PII.

22. The system of claim 16, wherein the consuming application or process flags the prompt as comprising PII for quality assurance upon a determination that the prompt comprises impermissible PII.

23. The system of claim 16, wherein the consuming application or process modifies the prompt to remove or redact the impermissible PII upon a determination that the prompt comprises impermissible PII and causes the modified prompt to be ingested by the GenAI model.

24. The system of claim 16, wherein the operations further comprise:
   determining, using a blocklist, whether the prompt comprises or elicits undesired behavior from the GenAI model.

25. The system of claim 24, wherein the operations further comprise:
   preventing the prompt from being ingested by the GenAI model when it is determined using the blocklist that the prompt comprises or elicits undesired behavior from the GenAI model.

26. The system of claim 25, wherein the operations further comprise:
   modifying the prompt to be benign when it is determined using the blocklist that the prompt comprises or elicits undesired behavior from the GenAI model; and
   causing the modified prompt to be ingested by the GenAI model.

27. The system of claim 16, wherein natural language processing is used to identify and extract strings belonging to specific entity types likely to comprise PII.

28. A system comprising:
   a plurality of first computing devices each having at least one hardware processor and forming a model environment and executing a generative artificial intelligence (GenAI model), the model environment executing a proxy which redirects inputs and outputs of the GenAI model to a monitoring environment; and
   a plurality of second computing devices each having at least one hardware processor and forming the monitoring environment, the monitoring environment executing an analysis engine and a remediation engine;
   wherein the analysis engine:
      receives data which characterizes a prompt for ingestion by the GenAI model model from the proxy;
      calls a remote service to identify, using each of a plurality of pattern recognition algorithms and a first machine learning model, personally identifiable information (PII) entities in the prompt, wherein each of the identified PII entities are classified as one of a plurality of PII entity types, the remote service determining whether aspects of the prompt comprise permissible PII or impermissible PII based on the PII entity type and context associated with the prompt;
      provides data characterizing the determination of whether aspects of the prompt comprises permissible or impermissible PII to a consuming application or process, the consuming application or process causing the remediation engine to remediation actions in connection with the aspects of the prompt that comprise impermissible PII while not modifying the aspects of the prompt that comprise permissible PII;
      receives an output of the GenAI model in response to the prompt, when it is determined that the prompt does not comprise impermissible PII;
      calls the remote service to determine, using the plurality of pattern recognition algorithms and a second machine learning model, whether the output comprises permissible PII or impermissible PII;
      determines whether the output indicates that the prompt contained or elicited malicious content or undesired behavior by the GenAI model based on a similarity analysis between a blocklist and the received data, the blocklist being derived from a corpus of machine learning model outputs responsive to malicious prompts;
      allows the output to be transmitted to a requesting user when it is determined that the output does not comprise impermissible PII and it is determined that the output does not indicate that the prompt contained or elicited malicious content or undesired behavior;
      instructs the remediation engine to prevent the output from being transmitted to a requestor when it is determined that the output comprises impermissible PII; and
      instructs the remediation engine to prevent the output from being transmitted to a requestor when it is determined that the output indicates that the prompt contained or elicited malicious content or undesired behavior.

* * * * *